May 14, 1968  B. C. HOULSTON  3,383,258
METHOD OF MAKING A FLEXIBLE HIGH PRESSURE HOSE
Filed Aug. 28, 1964  2 Sheets-Sheet 1

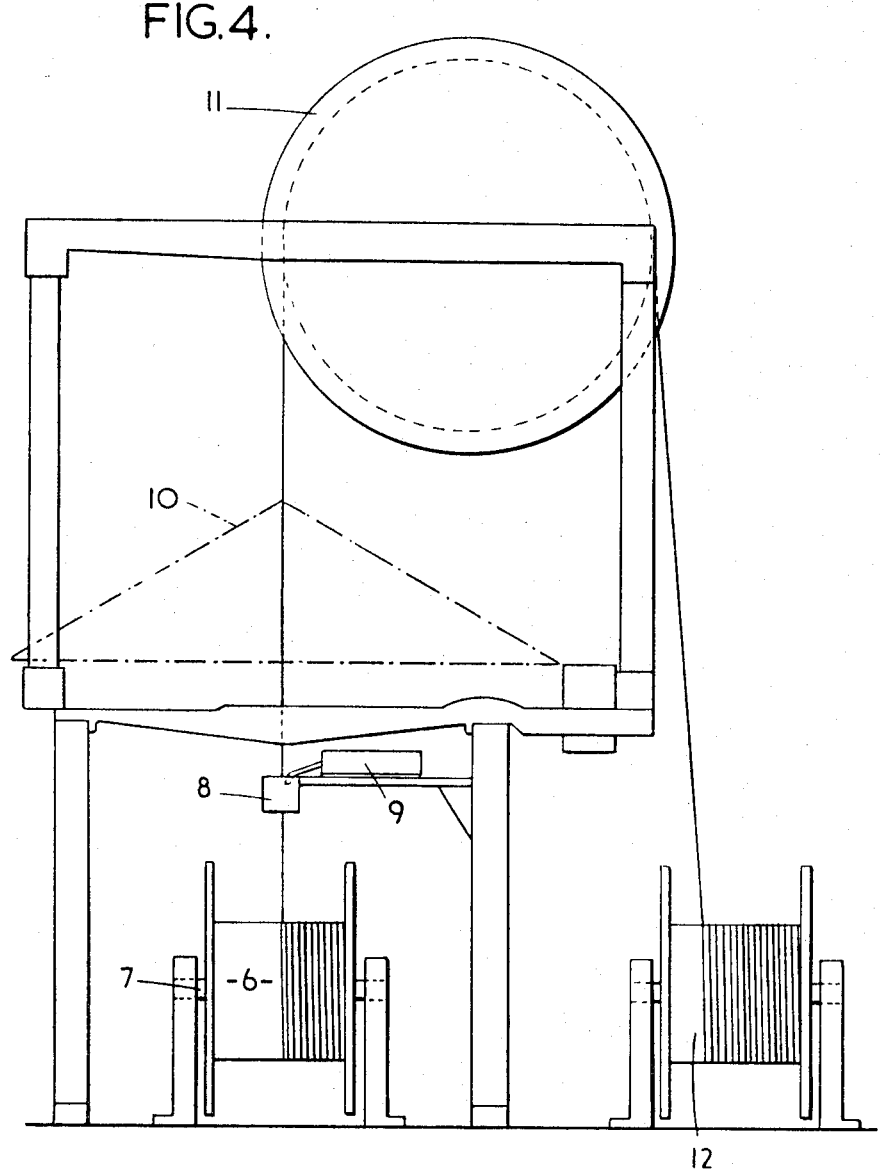

United States Patent Office 3,383,258
Patented May 14, 1968

3,383,258
METHOD OF MAKING A FLEXIBLE
HIGH PRESSURE HOSE
Brian Chilton Houlston, Birmingham, England, assignor to Alfred Roberts & Sons Limited, Birmingham, England, a British company
Filed Aug. 28, 1964, Ser. No. 392,684
Claims priority, application Great Britain, Aug. 30, 1963, 34,345/63
7 Claims. (Cl. 156—86)

ABSTRACT OF THE DISCLOSURE

Flexible high pressure hose having very low volumetric expansion under high internal pressures is formed from an unplasticized nylon core, a braided yarn layer cemented thereto and a vulcanized rubber outer cover applied under controlled conditions while the nylon core is shrunk onto a sizing mandrel.

---

The standards required of such hose are extremely high in that it must not only stand up to pressures of several thousand pounds to the square inch but must also have an indefinite life whilst subjected to considerable flexing as a result of deflection of the vehicle suspension. In addition it is important that its expansion under pressure should be as low as possible.

Such tubing has hitherto been manufactured from a number of different materials and in various ways. One such construction consists of a rubber inner core, a reinforcing layer of braid or braided cotton, rayon, polyester, or a combination of these fibres, together with an outer cover of natural or synthetic rubber, the whole being cemented or bonded together.

Another such construction has made use of a nylon inner core, a polyester or nylon braid and a cover of nylon or other synthetic resins or compounds thereof. These constructions have all had certain disadvantages, however. For example in the case of the hose referred to with the rubber inner core one disadvantage is that a degree of internal volumetric expansion takes place when subjected to normal operating pressures which is higher than desired for modern applications. The size, weight and cost of this hose are also such that these things cannot be reduced below what are now their irreducible minimums without incurring further problems.

In the case of the hose with the nylon inner core and with a synthetic fibre braid, having a cover of nylon or synthetic resins, the disadvantages are various. One is that the internal expansion, though improved over that of the hose with the rubber inner core, still leaves much to be desired. Various materials have been used in the covers of such hoses but up to the present time all of them have suffered from one weakness or another insofar as the performance of the hose under its operating conditions is concerned. Such weaknesses have taken the form of one or more of the following disadvantages: poor abrasion resistance, poor resistance to the effects of ultra-violet light or ozone, battery acid or the hydraulic fluids commonly used. Some materials have also shown poor cold flexing resistance, a matter of considerable importance when the hose is used under severe winter conditions. A further serious disadvantage is that these hoses may tend to kink, especially close to the end fittings and when the hose is required to conform to small bend radii such as is sometimes found on the small modern cars. Such kinking is most undesirable since it can lead to risk of failure at this point and it has been the subject of much concern to the authorities concerned with the safety of road vehicles.

It is an object of this invention to provide a hose having the lowest possible cubical expansion during operation, thus ensuring the quickest possible brake response and maximum safety where the hose is used in hydraulic braking circuits, and at the same time to provide a hose having the best possible kink resistance, thus eliminating the risk of failure from this cause. Another object is to provide the best resistance to cold flexing and in combination with the other desirable features together with resistance to ozone, ultra-violet light, and other damaging influences; the construction moreover, unlike some of the constructions previously referred to and using a nylon inner core, by virtue of the materials used, the method of construction employed and the resultant advantages accruing thereto, will provide a hose having the lowest possible compression set and the lowest possible creep under severe load, thus improving the ability of the end fittings to remain coupled to the hose under conditions of the extremes of heat and/or cold and under conditions of load. This improves the factor of safety in this respect to a marked degree over some of the previous constructions referred to, and which also has been a matter of some concern to those involved.

According to the invention it is now proposed to manufacture high-pressure hose, suitable for use in hydraulic systems, by forming an inner hollow core of nylon, coating this with an adhesive, applying one or more layers of braided high tensile natural or synthetic yarn, which are bonded to the core by the adhesive, and which are penetrated by the adhesive; and finally applying an outer cover of natural or synthetic rubber (or a mixture of these). As will be explained later, the conditions under which the braiding is carried out and the manner in which the sheath is cured ensure that the braided layer or each such layer shrinks and grips the nylon core tightly and puts it under compressive stress, thereby severely restricting any tendency to expand even under high pressures.

The outer cover is also preferably bonded to the layers of reinforcement so that the whole construction is bonded together as a unitary whole. In this way the possibility of relative axial movement between the various layers comprising the construction is eliminated with the consequence that the resistance to distortion and bursting is enhanced. For example any local tendency of the wall of the hose to bulge is resisted not only by the fibres immediately under stress but also by those fibres in the axially adjacent parts on each side.

An important and further advantage of the bonding together of the layers into a unitary whole is to greatly improve the resistance to kinking.

The invention will now be further described by way of example with reference to the accompanying drawings, in which:

FIGURE 4 shows to a larger scale part of the apparatus of FIGURE 3.

Figure 1:
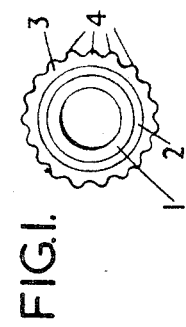
FIGURE 1 is an end view of the hose.
Figure 2:
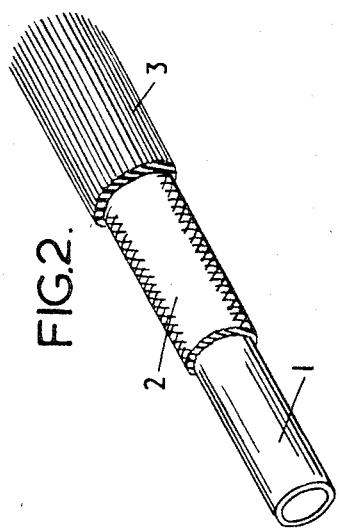
FIGURE 2 is a perspective view of one end of the hose, with some of the layers partly cut away.

Referring first to FIGURES 1 and 2, the hose to be produced by the method according to the invention comprises a core 1 of nylon 11 enclosed in one or more layers of braided reinforcing yarn 2, which could be of cotton or rayon but which in the preferred embodiment is of filaments of a synthetic polyester resin produced by condensing ethylene glycol and terephthalic acid and sold under the registered trademark "Terylene." Around the reinforcing layer or layers is an outer cover 3 which may be of natural or synthetic rubber but is preferably made of a mixture of these. In the preferred embodiment longitudinal ribs 4 are formed in the outer surface of this cover 3.

Figure 3:
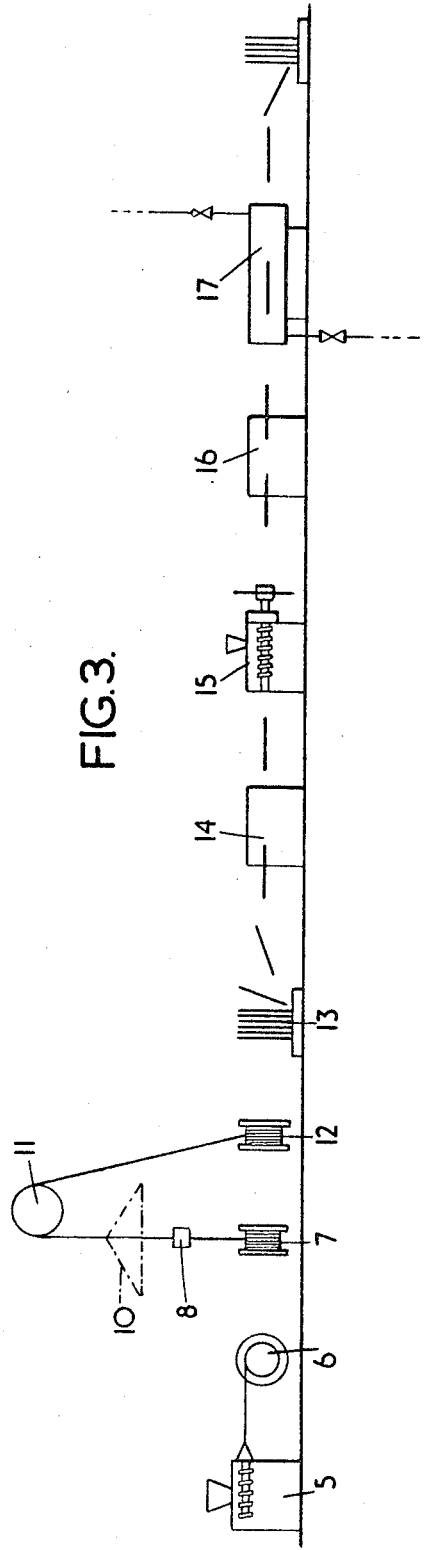
FIGURE 3 shows diagrammatically the apparatus used in the production of the hose.

To manufacture this hose using the apparatus of FIGURE 3, the first step is to extrude the hollow nylon core 1 in an extruder 5 in a known manner, and the resulting tube is coiled up on a storage drum 6. The inner diameter of the tube at this stage is larger than the final desired bore size of the hose, by a carefully controlled amount for reasons that will become apparent later. A suitable nylon is the unplasticized nylon sold under the trademark "Besno."

The drum or reel 6 of nylon is then mounted at 7 below a braiding machine 10, shown to a larger scale in FIGURE 4, and the nylon tube is led vertically upwards through an adhesive applicator in the form of a container 8 provided with seals where the nylon tube enters and emerges and kept filled with adhesive from a reservoir 9.

The adhesive used in the applicator is a liquid polyurethane elastomer comprising the product of the reaction of di-isocyanate with a polyalkylene ether glycol and it has a viscosity of between 6000 and 8000 cps. when determined by the Brookfield method at 86° Fahrenheit. This material is sold by Monsanto under the name Adiprene 167. In addition to the polyurethane the reservoir 9 also contains a catalyst to initiate polymerisation.

From the applicator the nylon tube passes immediately to a braiding machine 10 in which either one layer or two successive layers of braided polyester filaments are applied. The filaments are untwisted and, prior to the braiding operation, are wound onto the bobbins of the braiding machine through a tensioning frame.

The braided reinforcing layer of polyester fibre is applied while the nylon tube is, of course, still wet with the viscous liquid adhesive, which consequently permeates into and through the braided reinforcement.

From the braiding machine the covered tube passes over a pulley 11 to a take-up drum 12. It is then cut into individual lengths and the lengths, conveniently of six feet each, are fitted onto rigid metal rods or mandrels, which have a diameter equal to the final desired bore size of the hose, so the mandrels slip easily into the initially oversize lengths of tube.

From a store 13 the lengths of tube, on their mandrels, are passed successively through an applicator 14 in which they receive a coating of a further adhesive, this time a mixture of two parts of ethylene dichloride and one part of a twenty percent solution of triphenyl methane tri-isocyanate, and dried over calcium chloride.

The adhesive-coated lengths of tube are then passed through the T-box of a conventional rubber extruder 15 in which the outer cover is applied. The rubber compound used is a mixture of seventy parts by weight of the synthetic rubber known as Neoprene WRT and thirty parts by weight of natural rubber, in addition to the usual carbon black filler and plasticisers such as to give the material, when vulcanised, a hardness of between seventy-five and eighty degrees I.R.H.D. (International Rubber Hardness Degrees) and adequate low-temperature flexibility at −65° F. to −75° F. to meet the Society of Automotive Engineers Specification 40 R.I.

The length of hose is then inserted in a sheath or sleeve in a machine 16 in the manner described and claimed in British patent specification No. 789,968, the sheath being made of rubber of a different grade from that of the outer cover 3 and having an internal diameter in its free condition less than the external diameter of the cover 3. The inside of the sheath is ribbed so as to form the ribs 4 on the cover 3 and a lubricating or release agent prevents the sheath adhering to the hose.

The length of hose is finally subjected to a curing or vulcanising operation, still in its sheath, in a chamber 17 through which steam is passed. This final operation is of critical importance to the production of a hose of the desired outstanding properties and is not only for the purpose of vulcanising the rubber of the outer cover 3 but also has an important effect on the reinforcing layer or layers 2 and on the nylon core 1.

In the preferred process the vulcanisation is performed by keeping the hose, in its sheath, in the chamber 17 for a period of up to thirty-five minutes surrounded by steam at a pressure of forty pounds per square inch. Under these conditions, not only is the outer rubber cover 3 cured to form a tough protective layer, but also the nylon core 1 becomes softened and contracts onto the mandrel, producing a bore of closely uniform size.

The heat also tends to disorientate the highly orientated molecules of the Terylene braid, resulting in the braided layer or layers shrinking tightly onto the nylon core and compressing it, as well as causing the braided layer or layers actually to bite into the core, keying the reinforcement to it and, with the aid of the polyurethane adhesive which permeates the braid, bonding the core and reinforcing layer or layers together.

Furthermore, some of this adhesive, oozing through the braided layer or layers, joins the adhesive that was added at 14 to help to bond the outer cover 3 as well as to form a unified whole.

Tests have shown that, where the volumetric expansion of a typical known hose of the same bore diameter as that described is of the order of 0.31 of a cubic centimetre per foot length when subjected to an internal pressure of 1500 pounds per square inch, and where in the best known hose this figure has been reduced to 0.28 of a cubic centimetre, the hose made by the method described has an expansion of only 0.20 of a cubic centimetre. Where the hose is used in the hydraulic circuit of a vehicle braking system, this expansion represents directly wasted foot pedal travel, and the substantial reduction achieved is valuable in reducing pedal travel, allowing higher leverages to be used and producing more rapid braking response.

Instead of polyester fibers, rayon or cotton could be used for the braided reinforcement, but polyester fibers are preferred. In a modification of the process described the nylon tube is cut into lengths straight after extrusion and is passed through the adhesive applicator and the braiding machine already in this condition and already on mandrels, rather than being fed through on a continuous basis.

I claim:
1. A method of manufacturing a flexible high pressure hose, suitable for use in hydraulic systems, comprising forming an inner hollow core of nylon, coating this with an adhesive, applying at least one layer of braided yarn which is bonded to the core and is penetrated by the adhesive, locating said core upon a mandrel at least before the next following step, which mandrel is cylindrical and incompressible and has a diameter less than the internal diameter of the core at this stage but equal to the required final internal diameter of the core, applying an outer cover of rubber over said at least one braided layer and curing the outer cover by the application of heat and pressure to cause the nylon core to shrink onto the mandrel and the braiding to shrink onto the core.

2. A method as claimed in claim 1 wherein the nylon core consists of unplasticized nylon.

3. A method according to claim 1 wherein said mandrel is inserted before said at least one layer of braided yarn is applied.

4. A method according to claim 1 wherein a further adhesive is applied after said at least one layer of braided yarn and before application of the outer cover.

5. A method according to claim 1 wherein said outer cover comprises a mixture of natural and synthetic rubber.

6. A method according to claim 1 wherein said at least one layer of braided yarn comprises filaments of a polyester resin comprising the condensation product of ethylene glycol and terephthalic acid which is bonded to the core by a liquid polyurethane elastomer adhesive.

7. A method of manufacturing a flexible high pressure hose, suitable for use in hydraulic systems, comprising forming an inner hollow core of unplasticized nylon, coating this with an adhesive, applying at least one layer of untwisted braided yarn, said at least one layer of yarn being bonded to the core and being penetrated by the adhesive, locating said core upon a rigid cylindrical mandrel at least before the next following step, which mandrel has a diameter less than the internal diameter of the core at this stage but equal to the required final internal diameter of the core, applying a further layer of adhesive, applying an outer cover of rubber over said further layer of adhesive and curing the outer cover by the application of heat and pressure to cause the nylon core to shrink onto the mandrel and the braiding to shrink onto the core.

References Cited

UNITED STATES PATENTS

| | | | |
|---|---|---|---|
| 2,988,130 | 6/1961 | Rittenhouse | 156—86 |
| 3,049,762 | 8/1962 | Jackson | 156—149 |
| 2,977,839 | 4/1961 | Koch | 156—149 X |
| 3,284,259 | 11/1966 | Galloway et al. | 156—149 |
| 2,974,713 | 3/1961 | Hydrick | 156—149 |
| 2,512,433 | 6/1950 | Leben | 156—149 X |
| 3,062,241 | 11/1962 | Brumbach. | |
| 2,652,093 | 9/1953 | Burton | 156—149 X |
| 2,855,975 | 10/1958 | Ritchie et al. | 138—125 X |
| 2,934,096 | 4/1960 | Banks | 138—125 X |
| 3,038,523 | 6/1962 | Merck et al. | |

EARL M. BERGERT, *Primary Examiner.*

LAVERNE D. GEIGER, *Examiner.*

P. DIER, T. L. MOORHEAD, *Assistant Examiners.*